Dec. 30, 1969  J. H. MERCIER  3,486,530
PRESSURE DEVICE

Filed Sept. 29, 1966  3 Sheets-Sheet 1

INVENTOR
JACQUES H. MERCIER
BY
ATTORNEY

Dec. 30, 1969  J. H. MERCIER  3,486,530
PRESSURE DEVICE
Filed Sept. 29, 1966  3 Sheets-Sheet 2
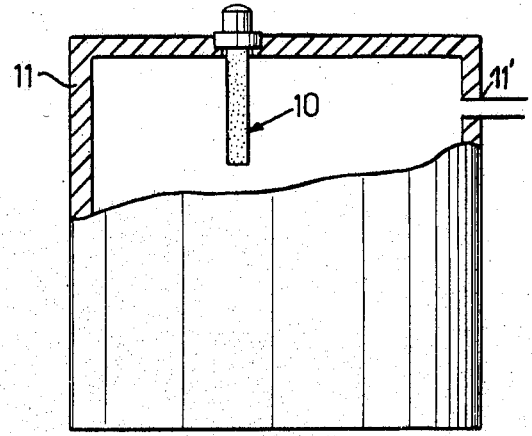
FIG.5
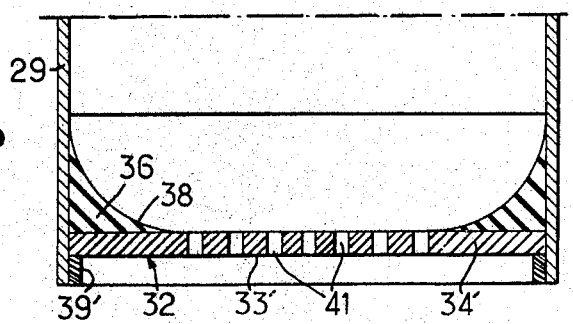
FIG.6
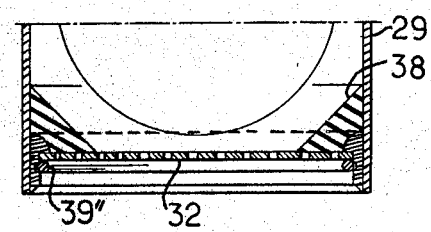
FIG.7
FIG.8
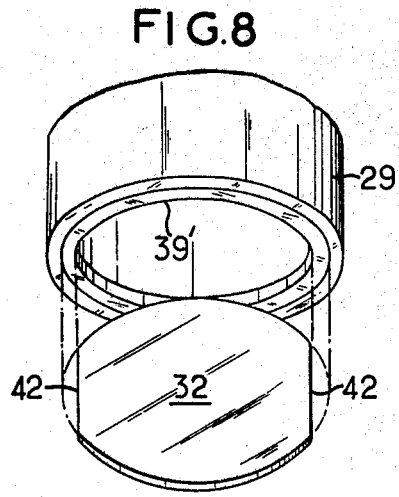
FIG.9
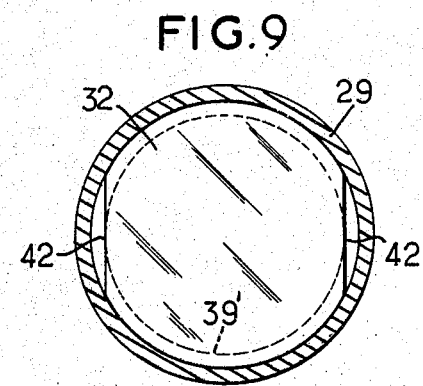
INVENTOR
JACQUES H. MERCIER
BY
ATTORNEY Dec. 30, 1969  J. H. MERCIER  3,486,530
PRESSURE DEVICE Filed Sept. 29, 1966  3 Sheets-Sheet 3

INVENTOR
JACQUES H. MERCIER
BY
ATTORNEY

United States Patent Office 3,486,530
Patented Dec. 30, 1969

1

3,486,530
PRESSURE DEVICE
Jacques H. Mercier, New York, N.Y., assignor to Olaer Patent Company, Luxembourg, Luxembourg, a Luxembourg corporation
Filed Sept. 29, 1966, Ser. No. 583,006
Claims priority, application France, Oct. 12, 1965, 34,621
Int. Cl. F16l 55/04
U.S. Cl. 138—30     13 Claims

ABSTRACT OF THE DISCLOSURE

This invention relates to the art of pressure devices and more particularly to a self-contained unit that can be incorporated into a pressure vessel, said unit comprising a cylindrical permeable sleeve in which a deformable bladder is positioned, the mouth of the bladder being secured to a charging fitting rigidly connected to one end of the sleeve with the other end of the sleeve being closed by a removable closure member.

---

It is among the objects of the invention to provide a self-contained pressure unit which may readily be incorporated into a pressure vessel of any shape or configuration and which will serve to compensate for changes in volume of the liquid in such vessel due to thermal expansion and contraction, and which also will serve as a shock absorber to compensate for sudden surges of liquid into such vessel.

Another object is to provide a pressure unit of the above type which may readily be fabricated at relatively low cost and which may readily be installed in such pressure vessel with relatively minor modifications of the latter.

According to the invention the pressure unit comprises a cylindrical cage or sleeve in which a deformable bladder is positioned. The mouth of the bladder is secured to a fitting that is rigidly connected to one end of the sleeve and has a passageway therethrough to permit charging of the bladder with gas under pressure.

The sleeve has the end thereof remote from the fitting closed by a renewable closure member and the sleeve according to a preferred embodiment has its wall surface perforated to permit ready flow therethrough of liquid but to restrain extrusion of the bladder positioned in the sleeve. Thus the sleeve serves as a cage to limit the expansion of the bladder which will expand to conform to the inner contour of said sleeve.

Figure 1:
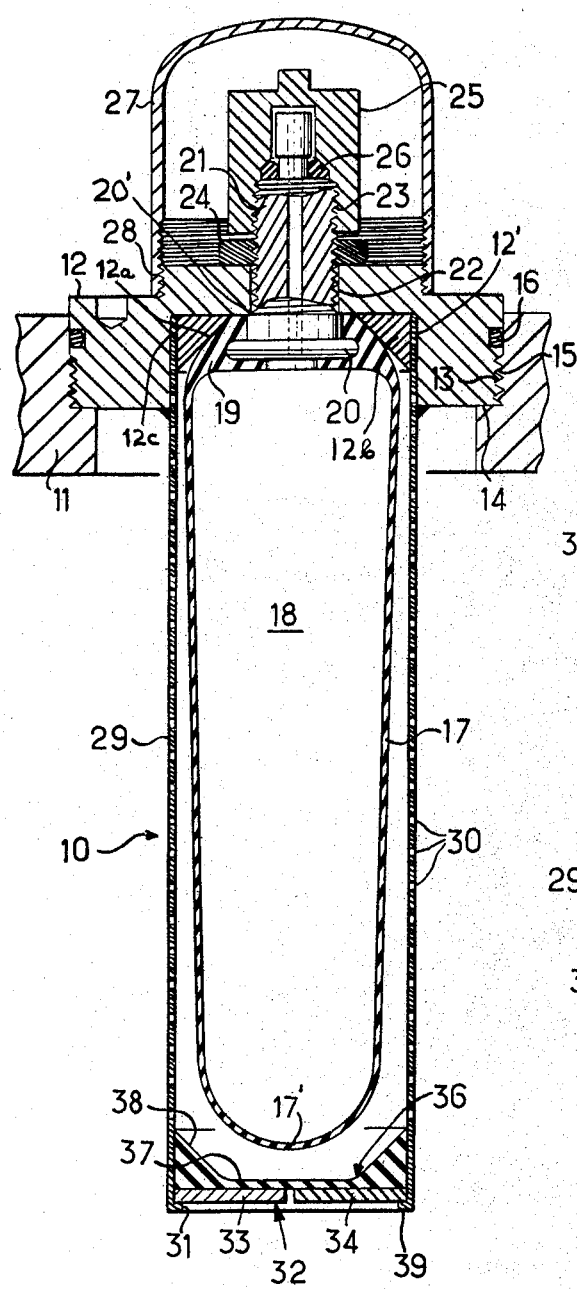
Figure 2:
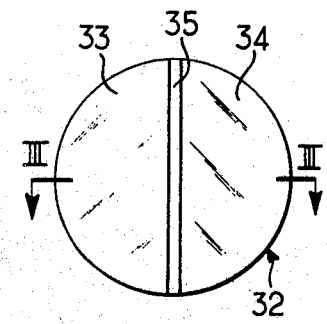
Figure 3:
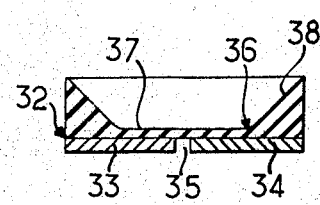
Figure 4:
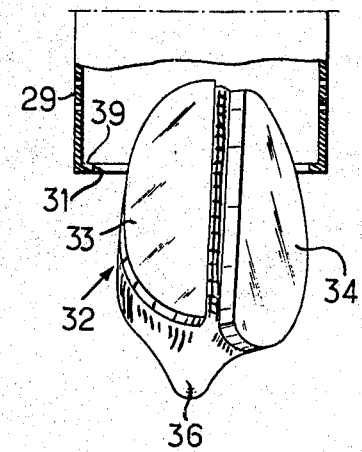
Figure 10:
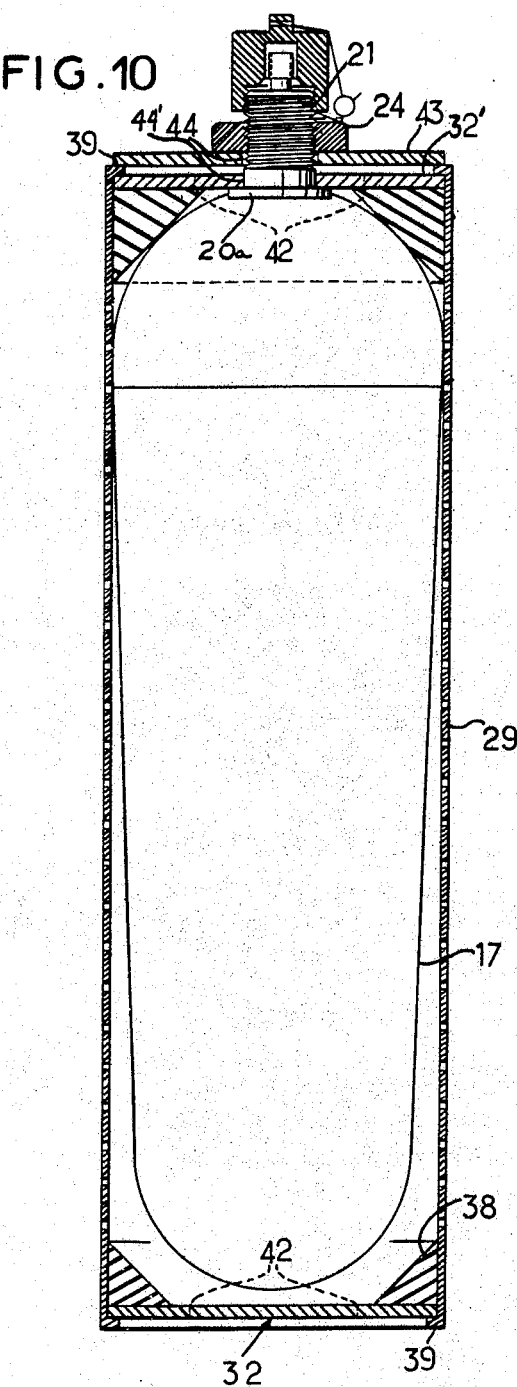

In the accompanying drawings in which are shown one or more of various possible embodiments of the several features of the invention, FIG. 1 is a longitudinal sectional view of a pressure unit, in accordance with the invention, FIG. 2 is a plane view of a removable closure member, FIG. 3 is a sectional view taken along line III—III of FIG. 2, FIG. 4 illustrates one method of inserting the closure member, FIG. 5 is a diagrammatic view of a pressure tank provided with a pressure unit, FIGS. 6 to 10 show various embodiments of the closure member and FIG. 10 shows still another embodiment of the pressure unit.

Referring now to the drawings, as shown in FIGS. 1 to 5, the pressure unit 10 is illustratively shown mounted in a pressure tank 11, for example, to maintain the tank under pressure; to compensate for the effect of thermal expansion or to dampen pulsations.

2

In the example shown, the pressure unit 10 has a mounting plug 12 by which it is fastened to the wall of the tank 11. More particularly, this wall has a threaded opening 13 provided with a shoulder 14 on which the plug 12 seats and the plug is threaded as at 15 to permit it to be screwed into the opening 13 until it abuts against the shoulder 14.

A gasket 16 is positioned in an annular groove in plug 12 and reacts against the unthreaded portion of the opening 13. The gasket is positioned adjacent the mouth of opening 13 so that upon unscrewing of the plug 12, the seal effected by the gasket will be broken to permit leakage before the plug is completely unscrewed. This prevents the violent expulsion of the plug at the time of its removal from opening 13.

The plug 12 has a cylindrical recess 12' into which extends an axial bore 22. Secured as by welding in said recess is one end 12c of a cylindrical sleeve on cage 29 which has a plurality of perforations 30. Secured in said end 12c is a relatively thick disc 12b which has a central opening with a beveled wall 12a aligned with axial bore 22.

The pressure unit 10 includes a deformable impermeable bladder 17, preferably of elastic material such as rubber or the like, which defines a variable-volume container 18 and which extends into the sleeve 29, the latter limiting the maximum expansion of the bladder.

The mouth 19 of the bladder 17 is bonded to the flanged end 20 of a fitting 21 which has a shoulder 20' that abuts against the periphery of axial bore 22 when a nut 24 secured on the externally threaded surface of the fitting is tightened. Thus the mouth of the bladder will be pressed tightly against the beveled wall 12a of disc 12b to provide a gas seal.

The fitting 21 has an axial bore therethrough leading into the bladder for charging thereof with gas under pressure. An internally threaded closure cap 25 is screwed over the thread 23 and tightly clamps a gasket 26 to prevent gas leakage.

The closure cap 25 is covered by a hood 27 which screws as at 28 onto the plug 12.

The other end of the sleeve 29 defines an opening 31 which has an inwardly extending annular flange 39. A removable closure member 32 is positioned in said opening 31 to permit the insertion and removal of the bladder 17.

In the example shown, the closure member 32 comprises two semi-circular diametrically opposed rigid segments 33 and 34 which are slightly spaced from each other at 35 along their common diameter. The segments 33 and 34 are connected together by a flexible portion illustratively a cup shaped member 36 of any suitable material, as for instance rubber or the like. The segments 33, 34 desirably are bonded to the relatively thin floor 37 of the member 36 forming an annular fillet 38.

To insert the closure member into the sleeve 29, it is merely necessary to fold the cup shaped member 36 along its central line 35 as shown in FIG. 4 to permit it to be inserted through opening 31. Thereupon with the closure member in the sleeve it is positioned so that the peripheries of the segments 33, 34 rest on the flange 39. In this position the floor 37 will be directed inwardly so that when the bladder is expanded its lower end 17' will engage the annular fillet 38 and the floor 37.

Due to the construction and arrangement of the closure member above described, since the bladder, when inflated, will retain the peripheries of the segments 33, 34 against flange 39, the member 32 cannot be removed before the bladder 17 has been sufficiently decompressed, which prevents violent expulsion of the closure member 32.

In operation, gas under pressure is forced into the bladder 17 through the fitting 21 until the pressure in the chamber 18 defined by the bladder has reached a predetermined value. The bladder will expand adapting itself to the shape of the sleeve 29 and the configuration of the cup shaped member 36.

The tank 11 has a part 11' to which a utilization line is connected and by means of which the tank may be charged with a liquid under pressure. When the pressure of the liquid in tank 11 is greater than the pressure of the gas in the chamber 18, the bladder 17 will be compressed. If the pressure of the liquid in tank 11 decreases, the bladder 17 will expand.

The pressure unit 10 thus makes it possible to maintain any tank or container under pressure; to compensate for the effect of thermal expansion and to absorb pulsations.

It will be noted that the pressure unit 10 is of simple and inexpensive construction and due to the multiplicity of perforations 30, which though small enough to prevent extrusion of the bladder will permit ready flow of liquid therethrough, will provide excellent absorption characteristics.

The closure member 32 shown in FIG. 6 is similar to the one which has just been described with reference to FIGS. 1 to 5. In the embodiment of FIG. 6 the two rigid segments, designated by 33' and 34', are perforated at 41 while the flexible portion 36 consists of a simple ring forming the fillet 38 and leaving the perforations 41 uncovered. It will be noted, furthermore, that the protruding flange of the opening 31 of the sleeve 29 is formed by a ring 39' forced into said opening. The side wall of the sleeve 29 is shown free of perforations in view of the presence of the perforations 41 in the segments 33' and 34'. If desired, the side wall could also have perforations.

In the embodiment, shown in FIG. 7, a removable snap ring 39" is positioned in an annular groove in a bushing secured to the end of the sleeve 29 releasably to retain a perforated closure disc 32 in position.

In the embodiment shown in FIGS. 8 and 9, the closure member 32 consists of a rigid substantially circular plate having two flats 42 by means of which it can be passed through the narrowed passage resulting from the annular flange 39', as shown in FIG. 8 whereupon, as shown in FIG. 9 the plate can then move against the flange 39'. Of course, instead of this arrangement, one could use any equivalent arrangement, for instance provide slits in the flange 39' permitting the introduction of the plate 32 which could then be without the flats 42.

The embodiment of the pressure unit shown in FIG. 10 is designed to be positioned entirely in a pressure tank.

In this embodiment the sleeve 29 has both of its ends formed with an inwardly extending annular flange 39. The ends of the sleeve are closed by closure members 32, 32', each desirably of the type shown in FIGS. 8 and 9 with the flats 42 to permit insertion thereof. An annular ring 38 is secured to the periphery of said closure members 32, 32'.

The closure member 32' has an axial opening 44' through which extends a fitting 21, the latter also extending through an opening 44 in a plate 43 the periphery of which is adapted to seat on the outer surface of the associated flange 39.

Thus when nuts 24 is tightened the annular flange 20a of fitting 21 to which the mouth of bladder 17 is bonded will be clamped against plate 32', and the two plates 32' and 43 will clamp the flange 39 therebetween.

With the construction above described, a relatively simple pressure unit is provided which may readily be incorporated into a liquid tank to take up pulsations, pressure surges and compensate for volume variations of liquid in said liquid tank.

Having thus described my invention, which I claim as new and desire to secure by Letters Patent of the United States is:

1. A pressure unit for a liquid tank comprising an elongated sleeve having a permeable wall along substantially its entire length, an impermeable deformable bladder positioned in said sleeve and extending substantially the entire length thereof and defining a variable volume container, the maximum size of which is determined by the volume of said sleeve and a closure member at each end of said sleeve, said bladder being secured to one of said closure members and a fitting connected to said last closure member for charging of said bladder.

2. The combination set forth in claim 1 in which at least one of said closure members is removable.

3. The combination set forth in claim 1 in which said sleeve has a plurality of perforations to permit ready flow of liquid therethrough but restraining extrusion of said bladder.

4. A pressure unit for a liquid tank comprising a sleeve having a permeable wall, an impermeable deformable bladder positioned in said sleeve and defining a variable volume container, the maximum size of which is determined by the volume of said sleeve, a closure member at each end of said sleeve, said bladder being secured to one of said closure members, a fitting connected to said last closure member for charging of said bladder, said sleeve having an inturned annular flange at one end, the other closure member comprising a pair of semi-circular diametrically opposed rigid segments slightly spaced from each other along their common diameter, and a flexible member secured to said segments to permit folding thereof for insertion into said sleeve.

5. The combination set forth in claim 4 in which said flexible member is substantially cup-shaped having side walls and a floor to which said segments are secured.

6. The combination set forth in claim 4 in which said flexible member is substantially cup-shaped having side walls and a floor, said segments being secured to the outer surface of said floor, said walls having a beveled inner surface.

7. A pressure unit for a liquid tank comprising a sleeve having a permeable wall, an impermeable deformable bladder positioned in said sleeve and defining a variable volume container, the maximum size of which is determined by the volume of said sleeve, a closure member at each end of said sleeve, a plug having a cylindrical recess at one end, into which one end of said sleeve is secured, said plug having an axial bore leading into said recess, said plug defining one of said closure members, a fitting extending through said axial bore, said bladder being secured to the rear end of said fitting, said fitting being externally threaded, a nut encompassing said fitting to lock the latter in place, said fitting having a passageway therethrough for charging of said bladder.

8. The combination set forth in claim 7 in which said plug is externally threaded and said liquid tank has a threaded port to receive said threaded plug.

9. The combination set forth in claim 4 in which said segments have a plurality of perforations therethrough.

10. A pressure unit for a liquid tank comprising a sleeve having a permeable wall, an impermeable deformable bladder positioned in said sleeve and defining a variable volume container, the maximum size of which is determined by the volume of said sleeve, a closure member at each end of said sleeve, said bladder being secured to one of said closure members, a fitting connected to said last closure member for charging of said bladder, said sleeve having an inturned annular flange at one end and said other closure member comprises a circular disc having at least a flat to permit insertion of said disc through the opening defined by said annular flange.

11. The combination set forth in claim 10, in which a resilient member is adjacent to the periphery of said disc.

12. A pressure unit for a liquid tank comprising a sleeve having a permeable wall, an impermeable deformable bladder positioned in said sleeve and defining a variable volume container, the maximum size of which is determined by the volume of said sleeve, a closure member at each end of said sleeve, said bladder being secured to one of said closure members, a fitting connected to said last closure member for charging of said bladder, said sleeve having an inturned annular flange at one end and said last closure member comprising two circular discs at least one of which has a pair of opposed flats to permit insertion of said disc through the opening defined by said annular flange, and means to clamp the annular flange between the two discs.

13. A pressure unit for a liquid tank comprising a sleeve having a permeable wall, an impermeable deformable bladder positioned in said sleeve and defining a variable volume container, the maximum size of which is determined by the volume of said sleeve, a closure member at each end of said sleeve, both of said closure members being removable, said bladder being secured to one of said closure members, and a fitting connected to said last closure member for charging of said bladder.

References Cited

UNITED STATES PATENTS

| | | | |
|---|---|---|---|
| 2,543,585 | 2/1951 | Miller | 138—30 |
| 2,878,835 | 3/1959 | Peterson | 138—30 |
| 3,003,522 | 10/1961 | Rohacs | 138—30 |

PATRICK D. LAWSON, Primary Examiner